(12) United States Patent
Mozena

(10) Patent No.: US 6,494,636 B1
(45) Date of Patent: Dec. 17, 2002

(54) RETRACTABLE POLE APPARATUS

(76) Inventor: Gene Mozena, 9931 Cumberland Dr., Sun City, AZ (US) 85351

( * ) Notice: Subject to any disclaimer, the term of this patent is extended or adjusted under 35 U.S.C. 154(b) by 0 days.

(21) Appl. No.: 09/687,849

(22) Filed: Oct. 11, 2000

Related U.S. Application Data

(60) Provisional application No. 60/158,965, filed on Oct. 12, 1999.

(51) Int. Cl.[7] .................................................. F16B 7/10
(52) U.S. Cl. ............................... 403/109.2; 403/109.7; 403/349; 403/377; 52/121; 52/736.1
(58) Field of Search .......................... 403/109.1, 109.2, 403/109.7, 348, 349, 376–378, 379.1; 52/121, 169.13, 726.4, 111, 114, 123.1, 726.3, 736.1; 91/169; 404/6; 285/401, 402, 123.1, 302, 303

(56) References Cited

U.S. PATENT DOCUMENTS

| | | | | |
|---|---|---|---|---|
| 2,049,290 A | * | 7/1936 | Burns et al. ................ | 285/401 |
| 2,739,850 A | * | 3/1956 | Hollingsworth ............... | 52/121 |
| 2,989,329 A | * | 6/1961 | Noah ....................... | 403/109.2 |
| 3,679,065 A | * | 7/1972 | Aurtemma ................... | 312/312 |
| 3,878,314 A | * | 4/1975 | Link ........................... | 174/37 |
| 4,589,622 A | * | 5/1986 | Hutter ........................ | 248/649 |
| 4,663,900 A | * | 5/1987 | Rehm et al. .................. | 52/115 |
| 4,666,331 A | * | 5/1987 | Riley ............................ | 404/6 |
| 5,557,892 A | * | 9/1996 | Lavin ......................... | 525/121 |
| 5,975,792 A | * | 11/1999 | Goeken ........................ | 404/6 |
| 6,247,991 B1 | * | 6/2001 | Chen ........................... | 446/242 |

FOREIGN PATENT DOCUMENTS

FR              2527280     * 11/1983 ................. 403/349

* cited by examiner

Primary Examiner—Flemming Saether
Assistant Examiner—Michael P Ferguson
(74) Attorney, Agent, or Firm—Gregory J. Nelson

(57) ABSTRACT

An extendible and retractable apparatus for displaying a flag or supporting an item such as an athletic net. The apparatus has a lower fixed tubular member and one or more telescopic sections which extend and are lockable in an extended position by keyed locking means. The telescopic members are extendible and retractable by means of a cable driven and guided through friction rollers.

7 Claims, 5 Drawing Sheets

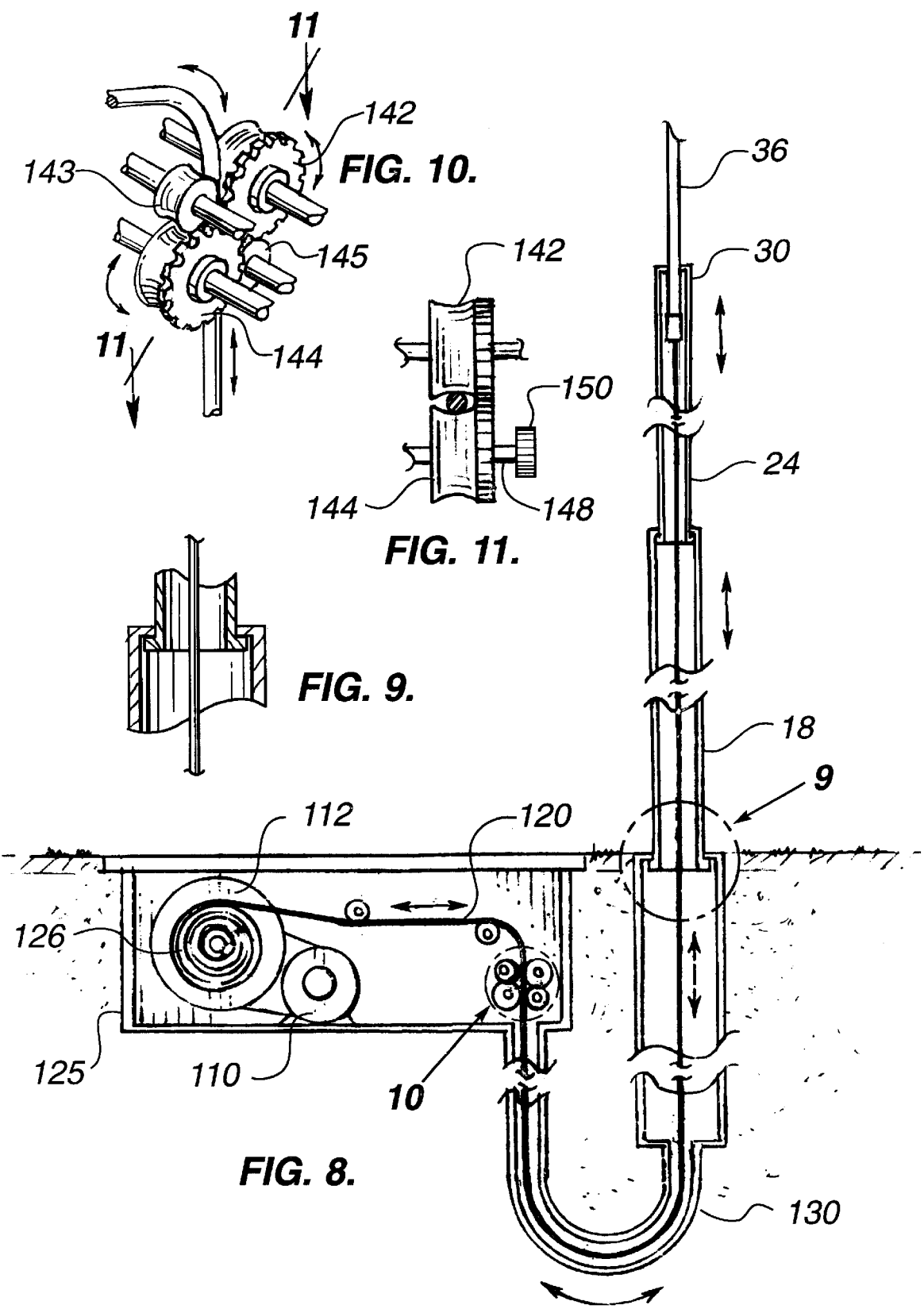

RETRACTABLE POLE APPARATUS

This application is based on provisional patent application Ser. No. 60/158,965, filed Oct. 12, 1999, entitled "Retractable Pole Apparatus."

FIELD OF THE INVENTION

The present invention relates to a retractable and extendable telescopic pole apparatus for displaying flags or supporting athletic equipment, patio umbrellas and the like.

BACKGROUND OF THE INVENTION

Many items such as flags, tennis and volleyball nets, shade screens and the like are supported on poles. If the poles are permanent, they present a hazard as well as being aesthetically displeasing. Temporary poles require removal, storage and installation and a are not convenient for these reasons. Accordingly, there exists a need for a convenient, permanent apparatus which can be easily extended when used and retracted to an out-of-the-way position when not in use.

SUMMARY OF THE INVENTION

The present invention provides a retractable pole apparatus including a fixed supporting member having a longitudinal axis and which support includes a bottom end, a top end, and a first extension member support means. A first telescopic extension member is received in the support member. The first telescopic extension member includes a bottom end and a top end. A protective housing or casing may be provided in which the apparatus is mounted in an in-ground or other location.

In a preferred embodiment of the invention, a selected extension member support means includes an inner lock sleeve attached to an inner portion of a top member end of a telescopic extension member. The inner lock sleeve includes a key receiver, and an outer key sleeve is attached to an outer portion of a bottom member end of a telescopic extension member. The outer key sleeve includes a key received in a respective key receiver.

The key receiver includes a vertical key reception slot, a transverse key reception slot in communication with the vertical key reception slot, and a key end portion connected to the transverse key portion.

More specifically, the lower support member has only an inner lock sleeve, and the topmost telescopic extension member, that receives a flagpole or other item, has only an outer key sleeve. Each of the intermediate telescopic extension members have both an inner lock sleeve at a top portion of the respective telescopic extension member and an outer key sleeve at a bottom portion of the respective telescopic extension member.

In yet another embodiment of the invention, the telescopic sections may be operated by a cable and motor drive friction wheel and cable assembly which will extend and retract the sections.

BRIEF DESCRIPTION OF THE DRAWINGS

The invention will be better understood and the above objects and other objects will become more apparent after a study of the following detailed description taken in connection with the annexed drawings in which:

FIG. 8 is a sectional view of another embodiment in which the apparatus is a motorized retractable pole apparatus;

FIG. 9 is a detail view as indicated in FIG. 8;

FIG. 10 is a perspective view of the friction drive wheels as indicated in FIG. 8; and FIG. 11 is a sectional view taken along line 11—11 of FIG. 10.

DETAILED DESCRIPTION OF THE DRAWINGS

Figure 1:
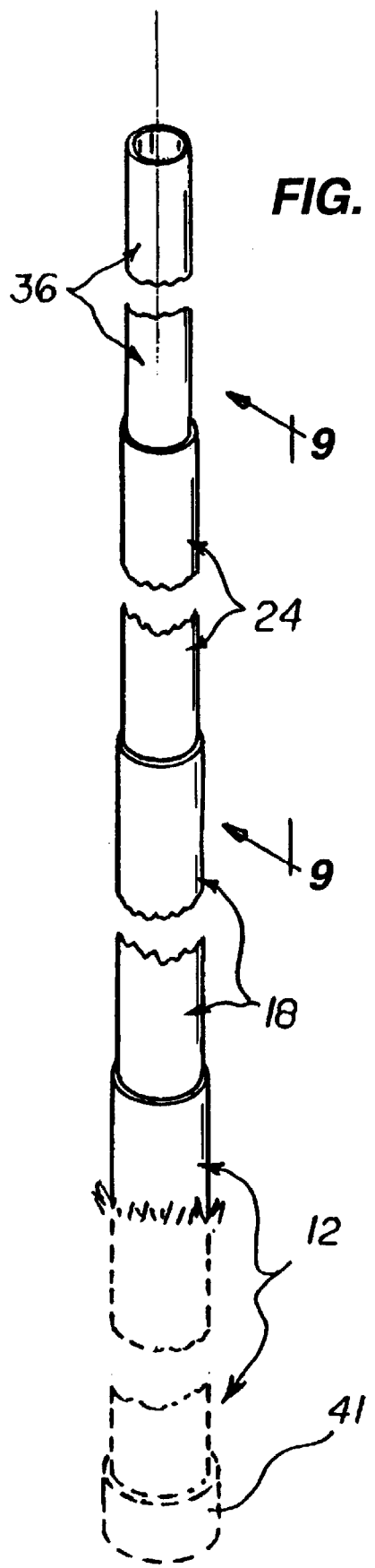
FIG. 1 is a perspective view of an embodiment of the retractable pole apparatus of the invention shown in an extended position.
Figure 2:
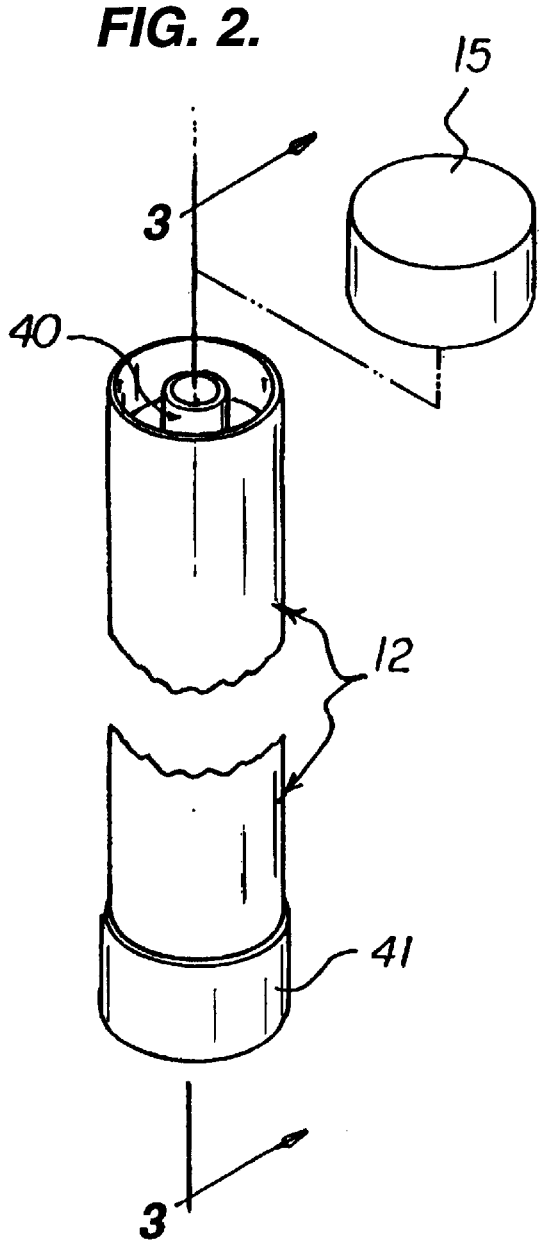
FIG. 2 is a partially exploded enlarged perspective view of the embodiment of the invention shown in FIG. 1 in a retracted position.
Figure 3:
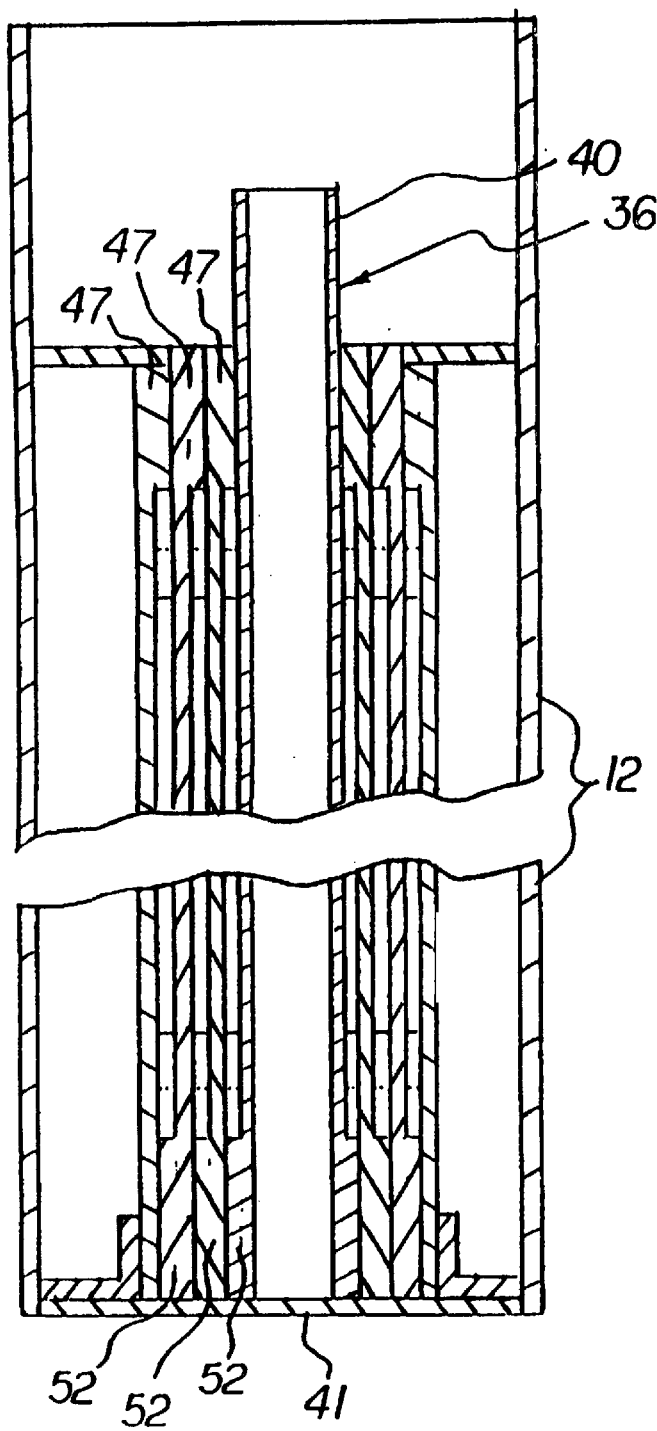
FIG. 3 is an enlarged cross-sectional view of the embodiment of the invention shown in FIG. 2 taken along line 3—3 thereof.
Figure 4:
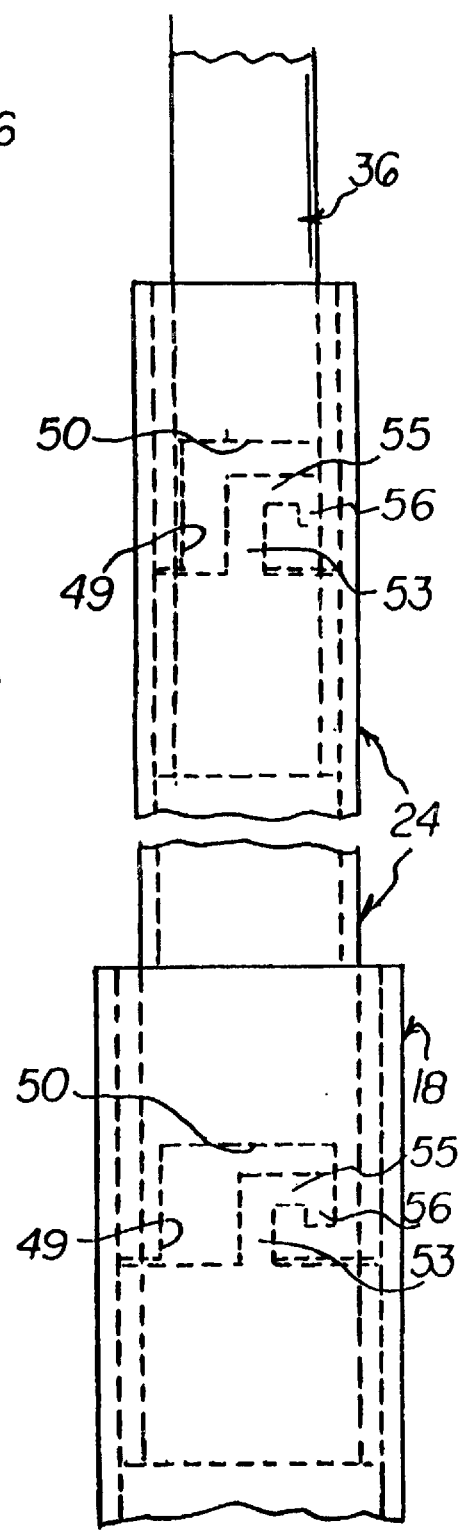
FIG. 4 is a partial longitudinal view of the invention.

With reference to the drawings, a new and improved retractable pole apparatus embodying the principles and concepts of the present invention will be described.

Turning to the embodiment of the invention shown in FIGS. 1 to 5, the pole apparatus is designated by the numeral 10 and has a number of tubular telescopic sections including a lower support member 12, first section 18, second section 24 and upper section 36. The embodiment of FIGS. 1 to 5 have a key locking arrangement to secure the members 18, 24 and 36 in an extended position. Accordingly, the respective extension member support means include an inner lock sleeve 47 attached to an inner portion of a top member end of a telescopic extension member. The inner lock sleeve 47 includes a key receiver, and an outer key sleeve 52 is attached to an outer portion of a bottom member end of a telescopic extension member. The outer key sleeve 52 includes a key received in a respective key receiver.

It will be apparent to those skilled in the art that, although three extension members are shown for purposes of representation, any number of extension members may be telescopically connected in the manner described. Also the members may be of various length and diameters depending on the intended use.

Figure 7:
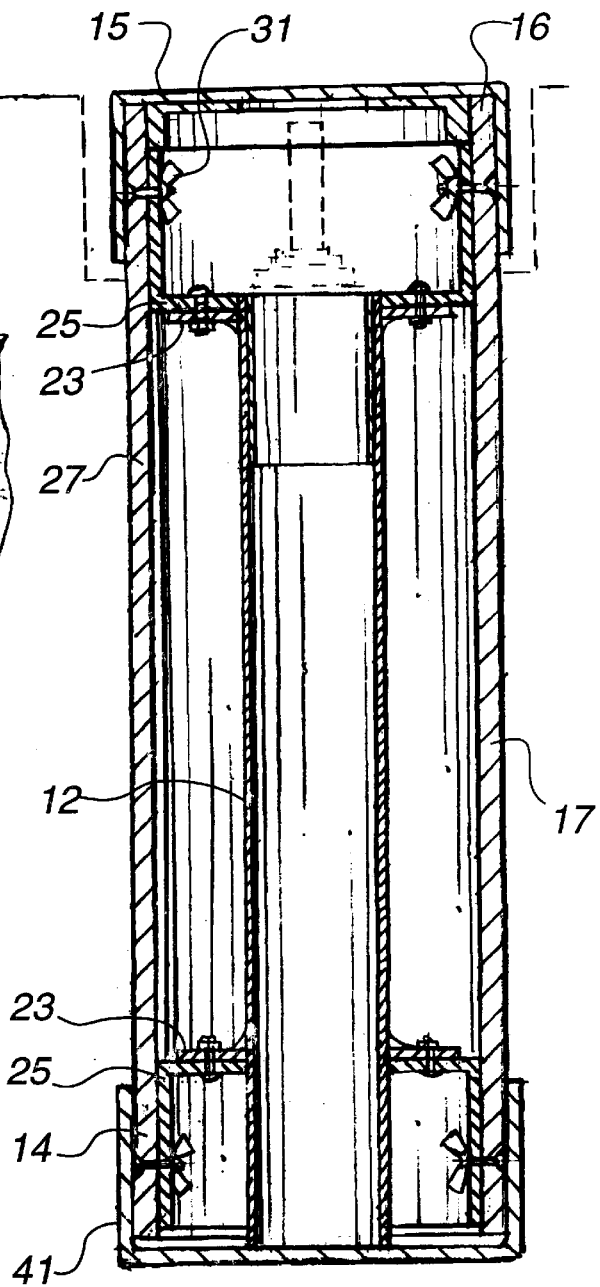
FIG. 7 is a cross-sectional view of the apparatus in a retracted, in-ground position.

The member 12 may be contained within a tubular housing 17 which has a top cap and a bottom cap 41 on top and bottom ends 16 and 14, respectively, as best seen in FIG. 7. The member 12 is retained by flanges 23 secured to annular retainers 25 by fasteners 27. The retainers 25 may be detached at wing nuts assemblies 31 so the housing 12 may be removed for repair, inspection or maintenance. The housing or casing 17 provides protection against the elements particularly in an in-ground installation.

The key receiver includes a vertical key reception slot 49, a transverse key reception slot 50 in communication with the vertical key reception slot 49. The key includes a riser key portion 53, a transverse key portion 55 connected to the riser key portion 53, and a key end portion 56 connected to the transverse key portion 55.

It is noted that the member 12 has only an inner lock sleeve 47, and the uppermost telescopic extension member has only an outer key sleeve 52. Each of the intervening telescopic extension members have both an inner lock sleeve 47 at a top portion of the respective telescopic extension member and an outer key sleeve 52 at a bottom portion of the respective telescopic extension member.

To operate the embodiment of the invention, the inner telescopic extension member is pulled up with respect to an outer telescopic extension member. When this is done, the key of the inner telescopic extension member is received in the key receiver of the outer telescopic extension member.

Figure 5:
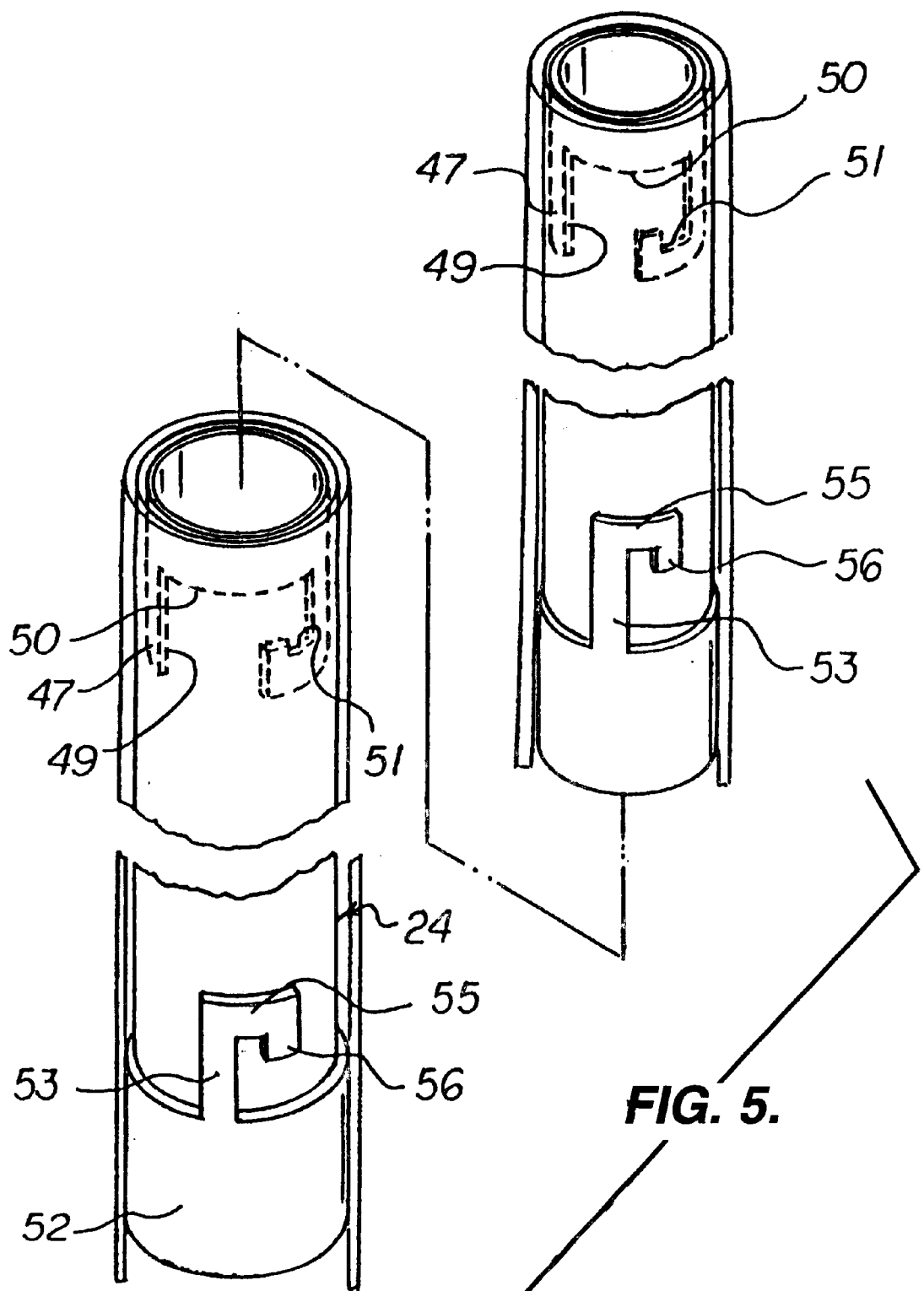
FIG. 5 is an exploded perspective view of the portion adjacent telescopic sections.
Figure 6:
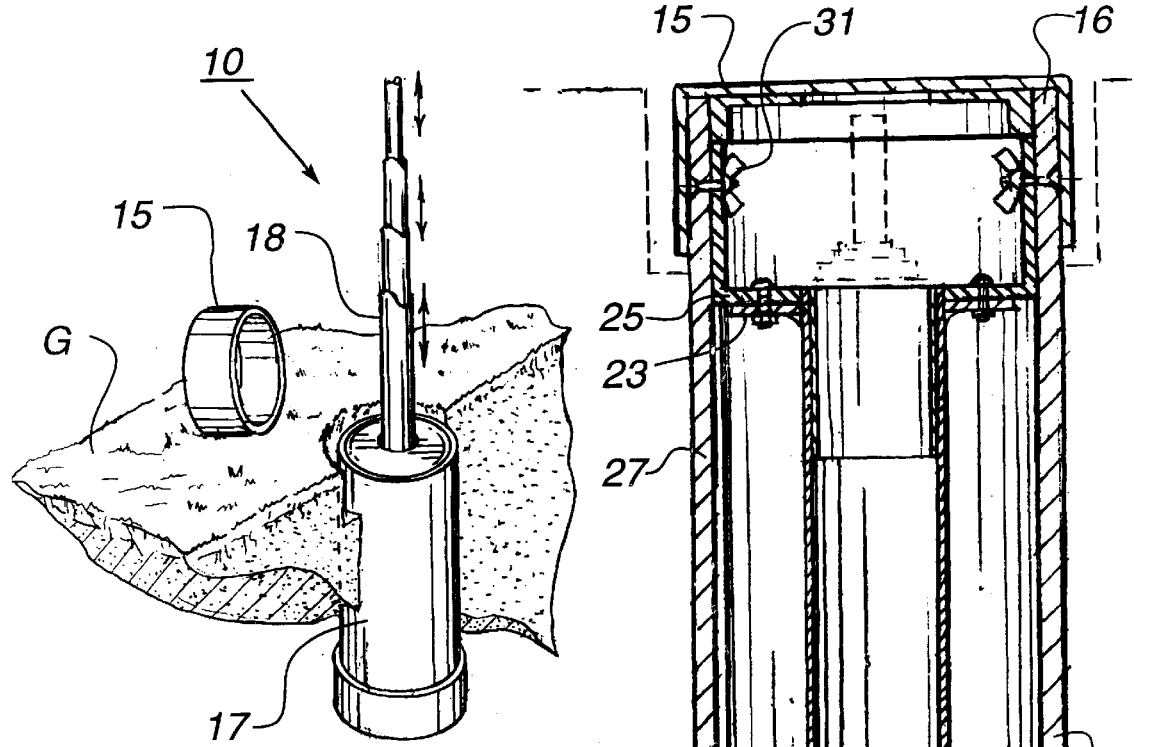
FIG. 6 is a detail perspective view of the embodiment of the invention shown in an in-ground location.

More specifically, for inner telescopic extension member 24 shown in FIG. 5, the riser key portion 53, the transverse key portion 55, and the key end portion 56 pass through the vertical key reception slot 49 of the outer telescopic extension member 18. When fully extended upwardly and rotated, the transverse key portion 55 engages the first transverse key reception slot 50 and the key end 56 seats in slot 51. Then, the inner telescopic extension member is prevented from rotating with respect to the outer telescopic extension member.

In addition, it will be understood that this locking procedure is carried out for each telescopic extension member.

To place the embodiment of the invention shown in the retracted mode, each telescopic member is raised to permit the respective key end portion 56 to be lifted out of the respective key end reception slot 51. Then, the inner telescopic member is rotated so that the all of the key will pass through the respective key receiver. When this is done, the respective inner telescopic member can be lowered with respect to the respective outer telescopic member. This procedure is repeated until all of the telescopic members are nested inside adjacent telescopic members.

The respective inner lock sleeves and outer key sleeves can be secured to the respective telescopic members using friction fitting, welding, solder, adhesives, or other suitable methods of attachment.

Uses of the retractable pole apparatus 10 can be expanded to other uses. For example, a pair of retractable pole apparatuses 10 of the invention can be placed on opposite sides of a driveway. When the retractable pole apparatuses 10 are extended, a chain or rope can be supported between the two retractable pole apparatuses 10 to serve as a barrier to driveway access. The poles can also be used to support athletic equipment such as tennis and volleyball nets and can also be used to support items as patio umbrellas. When retracted, the pole is in an out-of-the-way and out-of-sight position that does not present any obstacle or safety hazard.

The components of the retractable pole apparatus of the invention can be made from inexpensive and durable metal and plastic materials.

FIGS. 8 to 11 show yet another embodiment of the present invention designated by the numeral 100 which is raised and lowered automatically rather than manually. The apparatus has extendible pole sections 18, 24, 30 and 36, as described in previous figures. Locking pins or keys are not included.

The apparatus 100 includes a reel 112. The reel is rotatable on shaft 126 which is spring-loaded or biased in the direction of the arrow so as to wind cable 120 onto the reel. A motor 110 is connected to drive friction wheels 142, 143, 144 and 145 by a belt 114. Relatively stiff cable 120 may be payed out or wound on the reel. The motor and reel are contained in a housing 125 which may be in-ground as shown. The cable extends through a U-shaped guide conduit 130 and is attached to upper telescopic member 36. The cable extends through friction wheels 142, 143, 144, and 145. Wheels 142, 144 are interconnected by gears for uniform rotation and pulley 150 is connected to the shaft 148 of wheel 144 as seen in FIG. 11. The surface of the wheels are preferably coated with a friction material.

In operation, the motor is energized in a first direction to drive the friction wheels in a direction to pay out cable from the reel 112 which will progressively extend the extension members upwardly, as seen in FIG. 8. Reverse operation will cause the telescopic members to be retracted to the stored, in-ground position.

The foregoing detailed description is considered as illustrative only of the principles of the invention. Numerous modifications and changes will readily occur to those skilled in the art and therefore, it is not desired to limit the invention to the exact construction and operation shown and described. Accordingly, all suitable modifications and equivalents falling within the broad scope of the subject matter described above may be resorted to in carrying out the present invention.

I claim:

1. An extendible and retractable support device comprising:
   (a) a first member defining an axially extending tubular interior, said first member having an upper and a lower end;
   (b) a key receiver sleeve in the interior of said upper end of said first member, said key receiver sleeve defining a key slot having a generally axial riser slot portion, a transverse key reception slot portion and a key end reception slot portion;
   (c) a second member having a generally cylindrical exterior and telescopically slidably within said key receiver sleeve and said first member, said second member having opposite first and second ends;
   (d) a key sleeve on the exterior of the lower end of the second member end, said key sleeve having an axial riser, a transverse key section and an axial key end, said key sleeve and key receiver sleeve having substantially the same diameter whereby said second member is guided by said sleeves as it telescopically slides; and
   (e) whereby said second member can be axially extended from a substantially fully retracted position bringing said key sleeve and key slot into axial alignment and thereafter rotated to cause said key end to seat in said key end reception slot thereby locking the members in an extended position and against rotation.

2. The extendible and retractable support device of claim 1 further including third and fourth members having cooperative locking key and key receiver means associated therewith.

3. The extendible and retractable support device of claim 1 wherein said first member is fixed within a housing, said housing having a removable cap.

4. The extendible and retractable support device of claim 1 wherein said support device carries securement means for attachment thereto in an extended position.

5. The extendible and retractable support device of claim 1 further including drive means and a reel, said reel having a cable secured thereto and attached to one of said members operative to extend said members to an extended position in one operational mode of the drive means and to retract said members in another operational mode of the drive means.

6. The extendible and retractable support device of claim 5 wherein said cable extends through at least a pair of friction wheels to guide said cable.

7. The extendible and retractable support device of claim 6 wherein said drive, reel and friction wheels are in a housing.

* * * * *